UNITED STATES PATENT OFFICE.

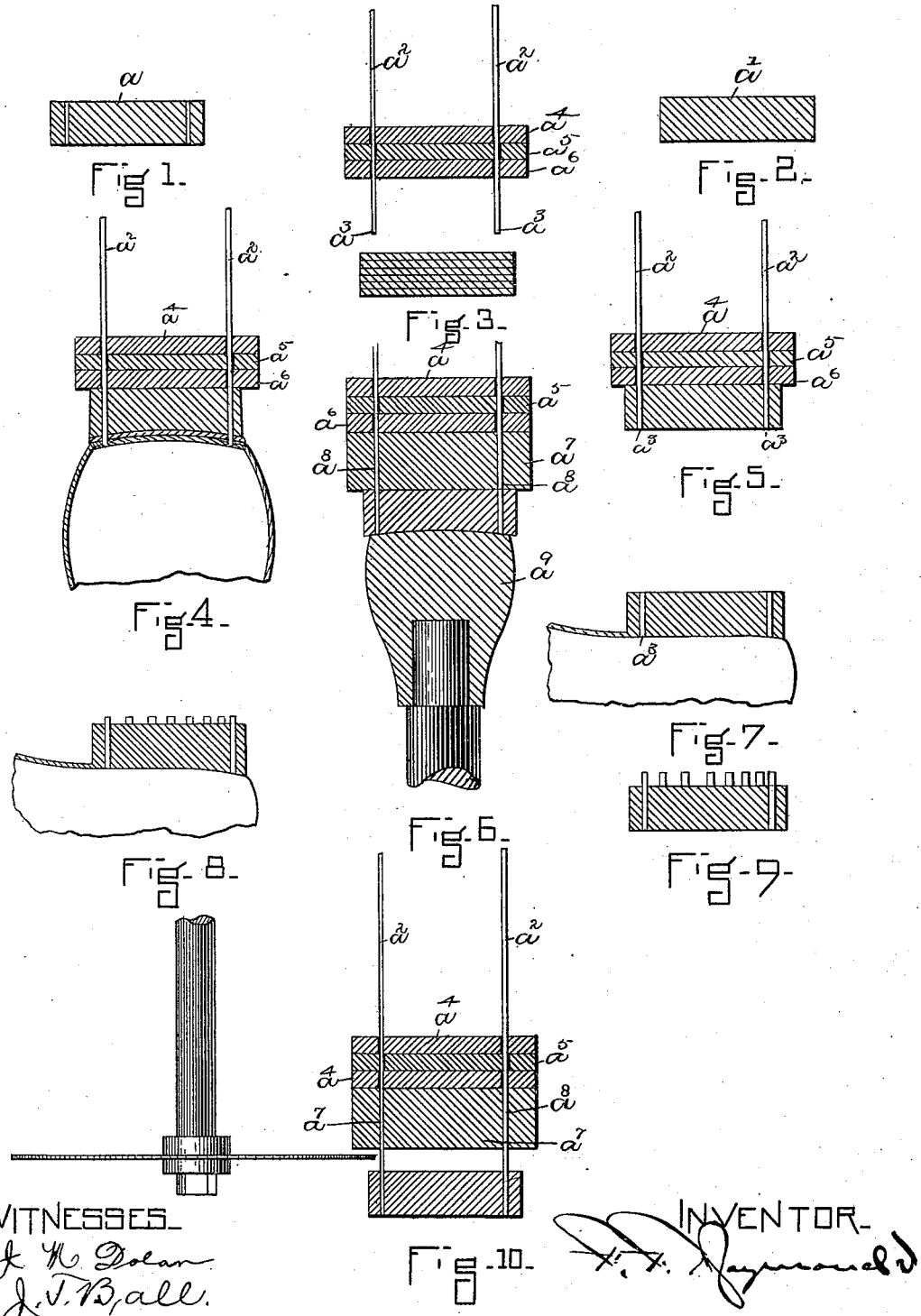

FREEBORN F. RAYMOND, 2D, OF NEWTON, MASSACHUSETTS.

METHOD OF ATTACHING HEELS.

SPECIFICATION forming part of Letters Patent No. 475,001, dated May 17, 1892.

Application filed July 13, 1889. Serial No. 317,398. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in the Method of Attaching Heels to the Soles of Boots or Shoes, of which the following is a full, clear, and exact description, reference being had to the accompanying drawings, forming a part of this specification, in explaining its nature.

The invention relates to the herein-described method of loading heel-blanks with nails or attaching heels to the soles of boots or shoes, which includes the driving of the ends of a gang or group of wires into the heel-blank, if the object be to load the heel, or into and through the heel-blank into the soles of a boot or shoe, if the object be to attach the heel-blank to the boot or shoe, and then severing or cutting the ends of the wires thus driven into the heel-blank at or above the tread end of the heel. This method of loading a heel-blank with attaching-nails or of attaching a heel-blank to the soles of a boot or shoe is very simple and effective and is easily practiced and reduces the expense of loading and attaching heel-blanks.

Referring to the drawings, Figure 1 represents a perforated heel-blank; Fig. 2, one that is not perforated; Fig. 3, the relation which the ends of the wire bear to the unperforated heel-blank before they are driven therein. Fig. 4 represents the position which they bear to the heel-blank after they are driven. Fig. 5 illustrates the relation which they bear to a perforated heel-blank after driving. Fig. 6 illustrates the introduction of the wires to the heel-blank through the holes of a wire-support. Fig. 7 is a detail view, in section, representing the attached heel-blank. Fig. 8 is a view in detail representing the wires as severed sufficiently above the top of the heel-blank to receive a top lift. Fig. 9 is a detail view representing the wires driven into a detached heel-blank. Fig. 10 represents the severing or cutting of the group of wires after they have been driven into the heel-blank to sever the driven portions from the remainder of the lengths.

In practicing the invention the heel-blank may or may not first be perforated or provided with holes into which the ends of the wires are inserted or driven. For high heels and for very hard heels it will be desirable to perforate or prick the heels to furnish holes for the ends of the wires before they are inserted. For ordinary work, however, the previous perforations or pricking of the heel-blank will not be necessary.

In the drawings, $a$ represents a heel-blank which has been previously prepared with holes for the reception of the ends of the wires, and $a'$ is a heel-blank that has not been previously perforated.

In practicing the process the wires $a^2$, which are of any desired gage and which may or may not have their ends pointed, are arranged as a gang or group, so that their ends $a^3$ are of the same line or of the same contour in section as the edge of the upper surface of the heel-blank, but of course upon a line within the line of the heel, and the wires thus arranged and suitably held are then either simultaneously or successively moved toward the heel-blank and their ends driven into the heel-blank any desired extent. I have represented them as arranged to be driven simultaneously, the wires being held for this purpose between the clamps $a^4$ $a^5$ $a^6$, to which pressure or movement may be applied in any desired way, and I have represented the ends of the wires as driven into the heel-blank and soles of a boot or shoe in Fig. 4 and into the heel-blank alone in Fig. 5. I prefer that the wires be held or supported by being passed through appropriate holes in a templet or holding-plate, as represented in Fig. 6, where $a^7$ represents such a plate, the plate having a separate guiding or holding hole $a^8$ for each wire and in this case the wire clamps preferably are arranged above the templet. In some instances, however, the templet may be dispensed with, the clamps alone being used, the wires being driven by them directly into the heel-blank. As a rule, it is desirable to compress the heel-blank during some portion of the driving of the wires. This may be done by moving the templet forcibly down upon the heel-support $a^9$ before the wires are driven, or the wires may first be driven and then the templet moved forcibly against the heel-blank, or in case of a loaded heel-blank the pressure may be applied upon the subsequent driving of the attaching nails or wires. The driving of the wires leaves the ends of the wires extending from the heel-blank, and the sections or ends of the wires which have been driven into the heel-blank are then severed from the undriven sections of the wires by causing the templet and clamp, or either, to be moved relatively to the heel-blank sufficiently to permit a cutting implement to be moved between the heel-blank and the surface of the templet or clamp opposite it, and the ends may then be severed either on a line with the tread or surface of the heel-blank or at any distance above the tread or surface of the heel-blank desired.

In Fig. 7 I have represented the wires cut upon the line with the tread of the heel-blank and in Fig. 8 upon a line above the tread-surface, sufficient of the length of the severed wires or ends being left to afford means for the attachment of a top lift by blind-nailing, and in Fig. 9 I have represeted the wires cut still farther from the tread-surface or at a distance sufficient to permit the subsequent further driving of the severed ends of the wire in the attachment of the heel-blank. The cutting of the wires at this distance from the tread is practiced when the process is used in making detached loaded heel-blanks. The ends of the wires may be thus severed or cut from the main lengths in any suitable way after their ends have thus been inserted or driven into the heel, and I have shown in Fig. 10 this cutting as accomplished or carried into effect by means of a saw adapted to be moved across the space between the tread-surface and the under surface of the templet, the saw acting to sever the various wires.

As above stated, the ends of the wires may be pointed before they are driven.

I would say that I do not confine the method to the driving of attaching-nails into the heels, as it may be used for the purpose of driving ornamental nails, wearing-nails, or slugs.

Having thus fully described my invention, I claim and desire to secure by Letters Patent of the United States—

The art or method of loading and securing a shoe-heel, substantially as set forth, which consists in assembling or grouping several continuous strands of wire in the form desired, firmly holding said strands in such position and simultaneously forcing the ends of said wire through the heel, and finally severing said wires.

FREEBORN F. RAYMOND, 2D.

Witnesses:
J. M. DOLAN,
J. T. BALL.